US012560026B2

(12) United States Patent
Letvin et al.

(10) Patent No.: US 12,560,026 B2
(45) **Date of Patent: *Feb. 24, 2026**

(54) SELF-CLOSING SAFETY GATE

(71) Applicant: PS Industries Incorporated, Grand Forks, ND (US)

(72) Inventors: Peter Allen Letvin, Emerado, ND (US); Daniel Thomas Satrom, Arvilla, ND (US); Chad Joseph Rose, Grand Forks, ND (US)

(73) Assignee: PS INDUSTRIES INCORPORATED, Grand Forks, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,613

(22) Filed: Jun. 11, 2024

(65) Prior Publication Data

US 2024/0328224 A1 Oct. 3, 2024

Related U.S. Application Data

(63) Continuation of application No. 17/694,337, filed on Mar. 14, 2022, now Pat. No. 12,037,836.
(Continued)

(51) Int. Cl.
*E06B 11/08* (2006.01)
*E05F 1/12* (2006.01)
(Continued)

(52) U.S. Cl.
CPC .......... *E06B 11/085* (2013.01); *E05F 1/1215* (2013.01); *E05F 3/14* (2013.01);
(Continued)

(58) Field of Classification Search
CPC ... E05F 3/14; E05F 3/20; E05F 1/1215; E05F 1/1207; E05F 1/12; E06B 11/022;
(Continued)

(56) References Cited

U.S. PATENT DOCUMENTS

| | | | |
|---|---|---|---|
| 243,238 | A | 6/1881 | Fouzer |
| 3,389,501 | A | 6/1968 | Arizona |

(Continued)

FOREIGN PATENT DOCUMENTS

| | | | |
|---|---|---|---|
| DE | 29808910 | U1 | 9/1998 |
| EP | 2752542 | A1 | 7/2014 |

(Continued)

OTHER PUBLICATIONS

"News / Kee Safety Gates Comply with New EN Standard," dated Jul. 31, 2017, by Kee Safety LLC, accessed on the Internet at https://keesafety.ae/news/kee-safety-gates-comply-with-new-en-standard on Aug. 19, 2019, 4 pgs.

(Continued)

*Primary Examiner* — Justin B Rephann
(74) *Attorney, Agent, or Firm* — Fredrikson & Byron, P.A.

(57) ABSTRACT

Self-closing safety gate embodiments are disclosed herein. The self-closing safety gates include a hinge plate configured to rotate about a vertical support member and engage a hoop portion. In some embodiments, the hinge plate includes at least one support arm portion with a channel. In such embodiments, the channel can be configured to receive and frictionally engage a hoop arm of the hoop portion with a compressive fastener. In some embodiments, the self-closing safety gate can be damped.

33 Claims, 11 Drawing Sheets

Related U.S. Application Data

(60) Provisional application No. 63/229,705, filed on Aug. 5, 2021.

(51) Int. Cl.
*E05F 3/14* (2006.01)
*E06B 9/04* (2006.01)
*E06B 9/00* (2006.01)

(52) U.S. Cl.
CPC .......... *E06B 9/04* (2013.01); *E05Y 2201/266* (2013.01); *E05Y 2900/40* (2013.01); *E06B 2009/002* (2013.01)

(58) Field of Classification Search
CPC .. E06B 11/085; E06B 2009/002; E06B 11/04; E06B 9/02; E06B 9/04; E05Y 2201/254; E05Y 2201/266; E05Y 2201/41; E05Y 2201/484; E05Y 2800/24
See application file for complete search history.

(56) References Cited

U.S. PATENT DOCUMENTS

| | | | | |
|---|---|---|---|---|
| 3,866,356 | A | 2/1975 | La Cook et al. | |
| D368,398 | S | 4/1996 | Nahar | |
| 5,921,027 | A | 7/1999 | Siebenahler | |
| 5,937,583 | A | 8/1999 | Lamperti | |
| 6,094,863 | A | 8/2000 | Lacook, Jr. | |
| 6,477,736 | B1 | 11/2002 | Abernathy | |
| 6,684,566 | B2 | 2/2004 | Lacook | |
| D557,586 | S | 12/2007 | Shire et al. | |
| 7,404,532 | B1 | 7/2008 | Baril | |
| D579,754 | S | 11/2008 | Gleason | |
| D628,409 | S | 12/2010 | Anzai | |
| 9,032,666 | B2 | 5/2015 | Honeycutt et al. | |
| D737,655 | S | 9/2015 | Oota et al. | |
| 9,476,239 | B2 | 10/2016 | Honeycutt et al. | |
| 9,719,299 | B2 | 8/2017 | Honeycutt et al. | |
| 9,765,558 | B2 * | 9/2017 | Talpe | E05F 3/10 |
| 9,926,738 | B1 | 3/2018 | Brown et al. | |
| 10,253,538 | B2 * | 4/2019 | Honeycutt | E06B 11/04 |
| 10,626,650 | B2 * | 4/2020 | Honeycutt | E05F 1/1207 |
| 10,633,905 | B2 | 4/2020 | Feng | |
| D1,022,660 | S | 4/2024 | Cai | |
| 2003/0230328 | A1 | 12/2003 | Chen | |
| 2005/0120517 | A1 | 6/2005 | Bonham | |
| 2007/0051934 | A1 | 3/2007 | Lacook | |
| 2007/0113378 | A1 | 5/2007 | Talpe | |
| 2007/0261201 | A1 | 11/2007 | Baer et al. | |
| 2008/0244983 | A1 | 10/2008 | Peterson | |
| 2009/0217591 | A1 | 9/2009 | Lacook | |
| 2010/0319260 | A1 | 12/2010 | Sawa | |
| 2012/0017393 | A1 | 1/2012 | Pate, Jr. | |
| 2013/0086842 | A1 | 4/2013 | Morrone, III | |
| 2013/0097806 | A1 | 4/2013 | Pate, Jr. | |
| 2013/0219790 | A1 | 8/2013 | Honeycutt et al. | |
| 2014/0068894 | A1 | 3/2014 | Nagl et al. | |
| 2016/0376824 | A1 | 12/2016 | Talpe | |
| 2017/0122019 | A1 | 5/2017 | Talpe | |
| 2018/0274288 | A1 | 9/2018 | Wang | |
| 2019/0040667 | A1 | 2/2019 | Feng | |
| 2020/0370370 | A1 | 11/2020 | Satrom et al. | |

FOREIGN PATENT DOCUMENTS

| | | | |
|---|---|---|---|
| JP | H08184253 | A | 7/1996 |
| WO | 9961743 | A1 | 12/1999 |

OTHER PUBLICATIONS

SlamProof "SlamProof Adjustable Speed Gate Closer Installation", Jan. 24, 2018 (Jan. 24, 2018), XP093006619, Retrieved from the Internet: URL:https://www.youtube.com/watch?v=060REoFYrWw.
International Patent Application No. PCT/US2022/039549, Invitation to Pay Additional Fees and Partial Search Report mailed Jan. 3, 2023, 12 pages.
Ps Industries Inc.: "New EdgeHalt Ladder Safety Gate", May 2, 2022 (May 2, 2022), XP055965139, Retrieved from the Internet: URL:https://www.youtube.com/watch?v=zqawkQnYbzA.

* cited by examiner

SELF-CLOSING SAFETY GATE

CROSS-REFERENCE TO RELATED APPLICATIONS

This application is a continuation of U.S. patent application Ser. No. 17/694,337, filed Mar. 14, 2022, which claims the benefit of U.S. Provisional Application No. 63/229,705, filed Aug. 5, 2021, the entire contents of both of which are incorporated herein by reference.

TECHNICAL FIELD

This disclosure relates generally to safety gates used to control access to hazardous areas or conditions.

BACKGROUND

Safety gates are generally used to limit or restrict access to hazardous areas or conditions, or to warn people of hazards beyond the point of the gate. As examples of such hazards, elevated surfaces (e.g., mezzanines, platforms, walkways, stair landings, etc.), machinery, chemicals, radiation sources, etc., may be present in certain settings and may present a risk of people getting injured or harmed. This can be especially so in industrial or commercial environments. Safety gates may be useful in a variety of similar environments. In many instances, such safety gates may be self-closing. These gates may be designed to meet codes set forth by agencies or groups such as OSHA, ANSI, CE, ISO, CSA and others.

Safety codes have evolved to require the use of self-closing safety gates on certain elevated work platforms, for example, to reduce the risk of personnel falling in areas such as at the top of a fixed ladder used to access the elevated platform. Gates that satisfy the safety code requirements and are intended for installations at the top of ladders are often called ladder safety gates. Ladder safety gates are often designed to swing or hinge (e.g., rotate) about a vertical axis. Certain safety codes require that ladder safety gates need to withstand dimensional and strength requirements. For example, certain safety gates may be required to withstand a 200 pound force applied in various locations and orientations.

The mechanism designed to enable the gate to be self-closing must be strong enough to ensure that the gate closes. The closing power of the self-closing mechanism must be strong enough to overcome windy conditions, for example, or gates that are installed on surfaces that are not perfectly plumb. Gates that meet the structural requirements of safety codes can be heavy, and the required self-closing power within the gate may result in undamped gates accelerating throughout the arc of rotation upon closing and accumulating potentially dangerous amounts of momentum prior to slamming shut against a stopping surface.

The above-mentioned safety code requirements for self-closing gates do not address the potential hazards of the gate slamming or pinching a person as the gate swings toward its closed position. The above-mentioned safety codes also do not describe the need for damping the closing motion of the safety gate. The prospect of the gate slamming into or pinching a person can create particularly concerning hazards in applications where a safety gate is installed within a guardrail opening that is used to access a ladder. Ladder users may, for example, decide to dedicate one hand to mitigating the slamming hazard of the gate, which may comprise their ladder ascent/descent (e.g., due to having fewer points of contact). Thus, a need exists for soft-closing or anti-slam safety gates.

Safety gates are often needed or desired in locations for safety reasons (e.g., to meet various code requirements for safety). It is often desirable to assemble a safety gate fairly quickly due to a changing workplace environment, for example. In some situations, it is desirable to adjust the width of a safety gate to meet the needs of a particular situation (e.g., access areas or openings of varying widths).

SUMMARY

A damped, self-closing safety gate is described according to some embodiments of this disclosure.

Certain embodiments of this disclosure may facilitate the damped closing motion of these gates. A damped, self-closing safety gate as described in this disclosure avoids slamming to a shut/closed position, which may prevent pinching, snagging on clothing, undesired noise, and mechanical wear, thereby making the safety gate safer to use and longer lasting. The described mechanism is low cost and can be added to or integrated into a self-closing swinging safety gate. Damping the closing speed of safety gates also enables time for workers to move through the access without having the gate close against them. Damping the closing speed of the safety gates can also reduce noise, vibration, and structural damage of safety gates and the adjacent guardrails.

In some embodiments, hinge mechanisms may be employed to enable the safety gate to swing clear of the access opening in a guardrail, for example, allowing the passage width to meet a minimum code requirement when the gate is swung open to 90 degrees or beyond (e.g., up to 180 degrees for a ladder safety gate). The damper mechanism according to various embodiments of this disclosure may preferably be chosen to function with existing hinge mechanisms in a way that minimizes obstruction of the guardrail access opening width, to thereby maintain any applicable safety code compliance and facilitate safe passage for the user.

In some embodiments, the dampening device may use viscous fluid damping. For example, the dampening device may be rotational acting (e.g., mounted coaxially to the hinge axis, mounted eccentric to the hinge axis). In another example, the dampening device may be linear acting. The dampening device may dampen motion across a full range and/or a partial range of swing by the safety gate. In some alternate embodiments, the dampening device may use air resistance. For example, the air resistance may be caused by a plate (e.g., plastic, metal, other) mounted to the gate. In another example, the air resistance may be caused by a sail (e.g., fabric) mounted to the gate. In some embodiments, the dampening device may comprise a shock absorber. For example, the shock absorber may use friction. In another example, the shock absorber may use viscous fluid. In another example, the shock absorber may use pneumatic air flow through an orifice. In some embodiments, a damped, self-closing safety gate may pivot about a generally vertical axis.

Certain embodiments of this disclosure may facilitate the assembly of self-closing safety gates. A self-closing safety gate that includes a hinge plate configured to be rotatably coupled to a vertical support member is described in this disclosure. A hinge plate according to this disclosure has at least one rotatable coupling portion to couple the hinge plate to the vertical support member, and at least one support arm portion comprising a channel adapted to receive and frictionally engage a hoop arm of a hoop portion of the self-closing safety gate.

A hinge plate for a self-closing safety gate is described in some embodiments of this disclosure. The hinge plate may have one or more support arm portions for engaging a hoop portion of the self-closing safety gate, and at least one rotatable coupling portion for rotatably coupling the hinge plate to a support member. A compressive fastener is used to engage the hoop portion to the hinge plate. The compressive fastener may facilitate assembly and/or adjustment of a dimension (e.g., a width) of the self-closing safety gate.

A self-closing safety gate is described in some embodiments of this disclosure. The self-closing safety gate may include a vertical support member, a hoop portion, and a hinge plate. The hinge plate is configured to engage the hoop portion using a compressive fastener. The compressive fastener may be formed in a support arm portion of the hinge plate adapted to receive a hoop arm of the hoop portion. The hinge plate may be further configured to be rotatably coupled to the vertical support member.

DETAILED DESCRIPTION

A "Damped Self-Closing Safety Gate" is disclosed and described in U.S. Provisional Patent Application Ser. No. 63/229,705, filed Aug. 5, 2021, relevant portions of which are incorporated by reference herein. A "Hinged Safety Gate" is disclosed in U.S. Published Patent Application No. 2020/0370370, filed May 23, 2019, relevant portions of which are also incorporated by reference herein.

Figure 1:
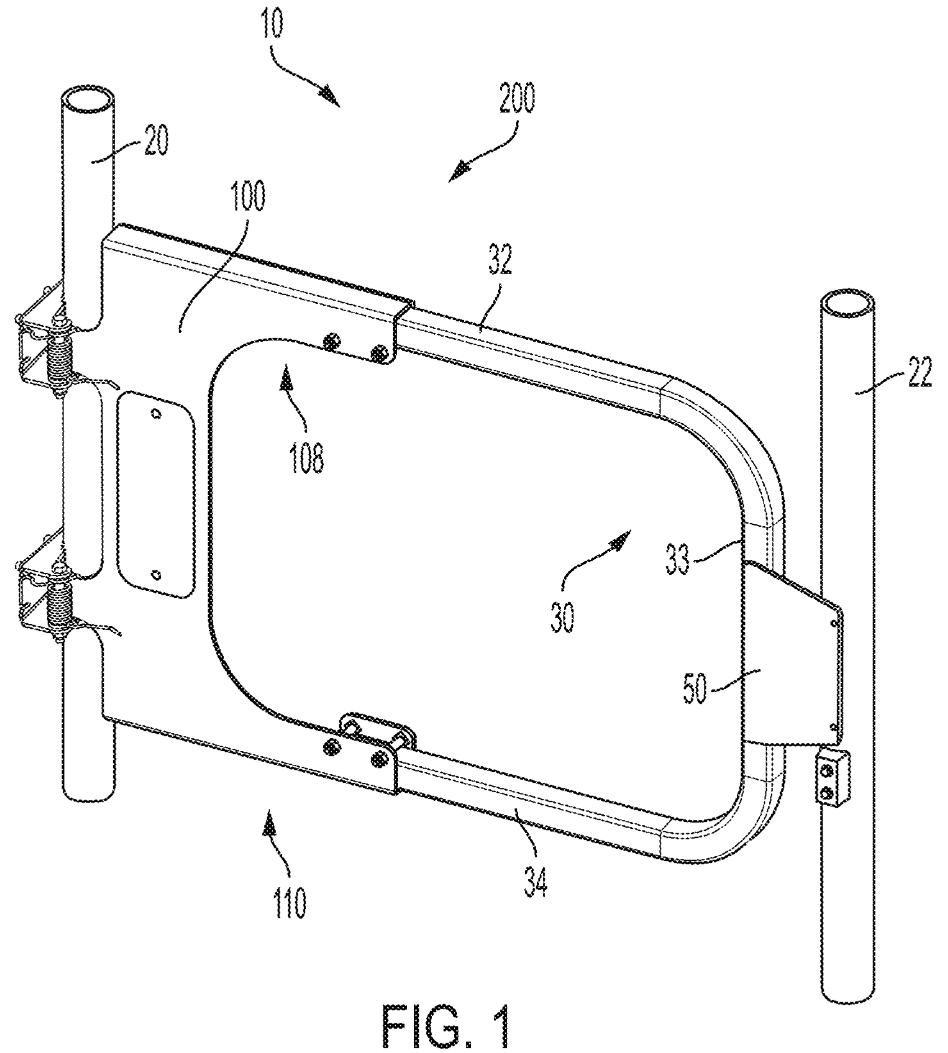
FIG. 1 is a perspective view of a self-closing safety gate in accordance with an exemplary embodiment of this disclosure.

FIG. 1 illustrates an exemplary embodiment of a self-closing safety gate 10 according to this disclosure. The self-closing safety gate 10, as shown, can be a self-closing swing gate assembly in some embodiments. In one application, the self-closing safety gate 10 can be used to warn of and/or restrict access to a dangerous or hazardous area or condition. In such an application, the self-closing safety gate 10 can provide a safety feature at a location where it may be desirable to provide periodic access, possibly accompanied by appropriate warnings, or by the provision of appropriate safety gear, etc. Self-closing safety gates commonly used at the top of ladders or other fall protection applications are often designed for use by trained personnel and may not be acceptable for locations that are accessible to the general public. Self-closing safety gates for use in areas accessible to the general public may have different requirements, such as more intermediate in-fill within the gate to prevent passage of people (e.g., children) through the gate. An example of a code applicable to areas that are open to the public would be the International Building Code (IBC). Workplace safety codes such as those promulgated by OSHA (e.g., OSHA 1910.28 and 1910.29), are designed for workplace environments where typically only trained or permitted individuals are present.

The self-closing safety gate 10 shown in FIG. 1 may include a vertical support member 20, and a gate frame 200 comprising a hinge plate 100 and a hoop portion 30. Hoop portion 30 may further include one or more hoop arms adapted to operably engage with hinge plate 100. In the particular embodiment depicted in FIG. 1, hoop portion 30 comprises both an upper hoop arm 32 and a lower hoop arm 34, wherein the upper and lower hoop arms 32, 34 comprise two substantially horizontal members; however, it is contemplated that a self-closing safety gate 10 according to this disclosure could alternately be formed using a single hoop arm (e.g., either an upper hoop arm 32 by itself or a lower hoop arm 34 by itself). Further, the hoop portion 30 may comprise a hoop distal portion 33 oriented generally vertically and coupled to either the upper hoop arm 32 or the lower hoop arm 34. Optionally, the hoop portion 30 of self-closing safety gate 10 may further include a gate stop or strike plate 50 coupled to, or integrally formed with, hoop distal portion 33. Hoop portion 30 may form any shape or configuration, for example, and may be integrally formed with hinge plate 100 (e.g., a single component) in some embodiments. A gate stop or strike plate 50, as shown in FIG. 1, may be used, for example, in conjunction with a stopping surface of vertical stop member 22 to stop the rotational swing of self-closing safety gate 10 at its closed position, as shown in FIG. 1. The gate stop or strike plate 50 may be adapted to stop the closure of the gate frame 200 when the gate stop or strike plate 50 contacts the vertical stop member 22.

Self-closing safety gate 10 may be pivotally or rotationally mounted to vertical support member 20 so as to swing or rotate about a pivot axis when opened. In the example shown in FIG. 1, the hinge plate 100 is rotatably coupled to the vertical support member 20, which serves approximately as an axis about which the self-closing safety gate 10 may rotate or pivot when opening or closing. The vertical support member 20 and vertical stop member 22 may be substantially as shown in FIG. 1, or may comprise other comparable arrangements, including for example, various guardrail substrates or flat walls.

Figure 2A:
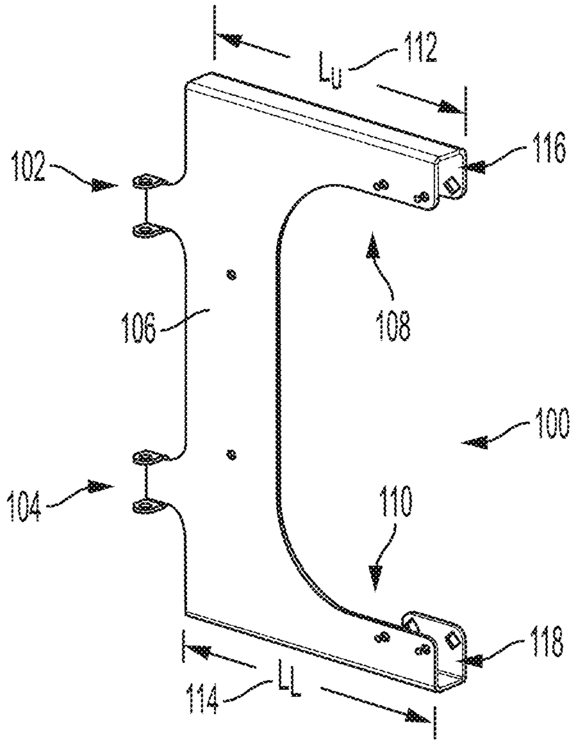
FIGS. 2A and 2B are front and rear perspective views, respectively, of a hinge plate in accordance with an embodiment of this disclosure.
Figure 2B:
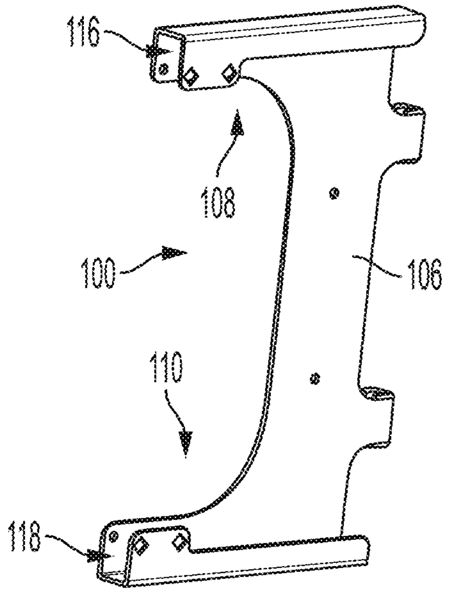

FIGS. 2A and 2B are front and rear perspective views of an exemplary hinge plate 100 that may be used for forming a self-closing safety gate 10 according to some embodiments. Hinge plate 100 may comprise a variety of configurations, and could, for example, comprise a tube structure according to some embodiments. FIG. 2A, for example, shows an example of a hinge plate 100 having two rotatable coupling portions (an upper rotatable coupling portion 102 and a lower rotatable coupling portion 104) disposed along a vertical portion 106 of hinge plate 100. This is exemplary, and hinge plate 100 could instead have a single rotatable coupling portion or could have more than two rotatable coupling portions according to various alternate embodiments. The at least one rotatable coupling portion is configured to rotatably couple the hinge plate 100 to the vertical support member 20. In some embodiments, a rotatable coupling portion may comprise a spring biasing assembly to bias the self-closing safety gate 10 towards a closed position.

The exemplary hinge plate 100 shown in FIG. 2A has two support arm portions, an upper support arm portion 108 and a lower support arm portion 110, each having a length ($L_U$ 112 and $L_L$ 114, respectively) extending generally away from the vertical portion 106 of hinge plate 100 (e.g., extending laterally from the vertical portion 106). It should be noted that the lengths $L_U$ 112 and $L_L$ 114 need not be equal and may be varied to meet functional requirements, as would be appreciated by one of ordinary skill in the art. The length of a support arm portion $L_U$ 112 and/or $L_L$ 114 may be chosen to be sufficiently long in order to accommodate a wider range of adjustment to an overall dimension of self-closing safety gate 10 (e.g., the overall width), as will be described herein. The use of two support arm portions is exemplary, and hinge plate 100 may instead comprise a single support arm portion or could have more than two support arm portions according to various alternate embodiments.

Hinge plate 100 may further include a channel formed in a support arm portion. In some embodiments, for example, a channel is formed in at least one of the upper support arm portion 108 and the lower support arm portion 110. In the exemplary embodiment shown in FIG. 2A, an upper channel 116 is formed in upper support arm portion 108, and a lower channel 118 is formed in lower support arm portion 110. In some embodiments, the channel formed in a support arm portion may extend substantially the length of the support arm portion. In other embodiments, the channel formed in a support arm portion may only extend for a short distance along the length of the support arm portion. In still other embodiments, the channel formed in a support arm portion may have varying channel depths along the length of the support arm portion. The upper channel 116 may have a width extending from a front face 145 of the hinge plate 100 to a rear face 146 of the hinge plate 100, and the lower channel 118 may have a width extending from the front face 145 of the hinge plate 100 to a rear face 147 of the hinge plate 100.

FIG. 2B shows an exemplary embodiment of a hinge plate 100 having both upper and lower channels 116, 118 formed in the upper and lower support arm portions 108, 110 where both channels 116, 118 employ a varying channel depth. In the embodiment shown in FIG. 2B, the raised portion (e.g., the portions of the channel shown with the deepest channel depth) of each channel is formed at a distal end of each respective support arm portion (e.g., distal to the vertical portion 106 of hinge plate 100). FIG. 2B shows the upper channel 116 and the lower channel 118 each including a proximal portion 148 and a distal portion 149, with the distal portion 149 extending vertically more than the proximal portion along the rear face 146, 147 of the hinge plate 100. However, the channels need not be disposed at the far distal end of a support arm portion and could alternately be disposed more proximal to the vertical portion 106 of hinge plate 100.

The upper and lower channels 116, 118 may be formed in a variety of ways. For example, a longer or shorter channel may be employed for supporting the engagement between the support arm portion and the hoop arm. Varying the height of the channel (or portions thereof) may also be employed according to various embodiments. For example, using a varying depth or height along a length of the channel may provide an interesting aesthetic appearance to the self-closing safety gate 10 according to some embodiments.

As noted above, the length of a support arm portion Ly 112 and/or Li. 114 may be chosen to be sufficiently long in order to accommodate a wider range of adjustment to an overall dimension of self-closing safety gate 10 (e.g., overall width). Such adjustment may be accomplished by varying the length of the hoop arm that is received within a channel of a support arm portion prior to establishing a frictional engagement between the hoop arm and the support arm portion. For example, a self-closing safety gate 10 may be adjusted to its greatest width when a minimum length of the hoop arm is received within the channel, and adjusted to its smallest width when a maximum length of the hoop arm is received within the channel. A longer support arm portion thereby supports a greater range of adjustment of the overall width of the self-closing safety gate 10 according to some embodiments. It should also be noted that the adjustment hereby enabled may be relatively precise and/or substantially continuous in nature; that is, the width adjustment is not limited to a finite number of discrete, step-wise adjustments as would be the case if, for example, a series of spaced-apart bolt-holes were formed in both the support arm portion and the hoop arm and fastening of the two components of the self-closing safety gate were restricted to aligning the corresponding bolt-holes for placement of bolts therethrough.

As has been described, a channel formed in a support arm portion of a hinge plate 100 may be configured to receive a hoop arm of a hoop portion during assembly of the self-closing safety gate 10. The channel may be shaped to slidingly receive a length of a hoop arm. The hoop arm is preferably shaped complementary to the shape of the channel in order to achieve the desired frictional engagement upon compression or narrowing of the channel. In the embodiments depicted in FIGS. 1, 2A, 2B, and 3, the channels are generally semi-rectangular in cross-sectional shape, corresponding to the generally rectangular cross-sectional shape of the hoop arms. This shape may also be referred to as "U"-shaped. A semi-rectangular shape (rather than a closed rectangular channel) provides an open portion; the open nature of the channel may, in part, facilitate the use of a compressive fastener, since it may enable compression of the channel to occur at a location beyond (e.g., above or below) a hoop arm disposed in such a channel. In alternate embodiments, the channel and corresponding hoop arm may be generally "C"-shaped (e.g., the channel forming a semi-circular cross-sectional shape with an open portion), and the hoop arm being generally circular in cross-section in such an embodiment). In other alternate embodiments, the channel and corresponding hoop arm may be generally "V"-shaped (e.g., the channel forming a "V"-shaped cross-sectional shape, and the hoop arm being generally "diamond"-shaped in cross-section in such an embodiment). Other possible shapes for the channel and corresponding hoop arms may be chosen by one of ordinary skill in the art with the benefit of these teachings. Additionally, the channels shown in the accompanying figures have openings that face upward or downward, but front-facing and/or rear-facing channel openings are also contemplated.

Figure 2C:
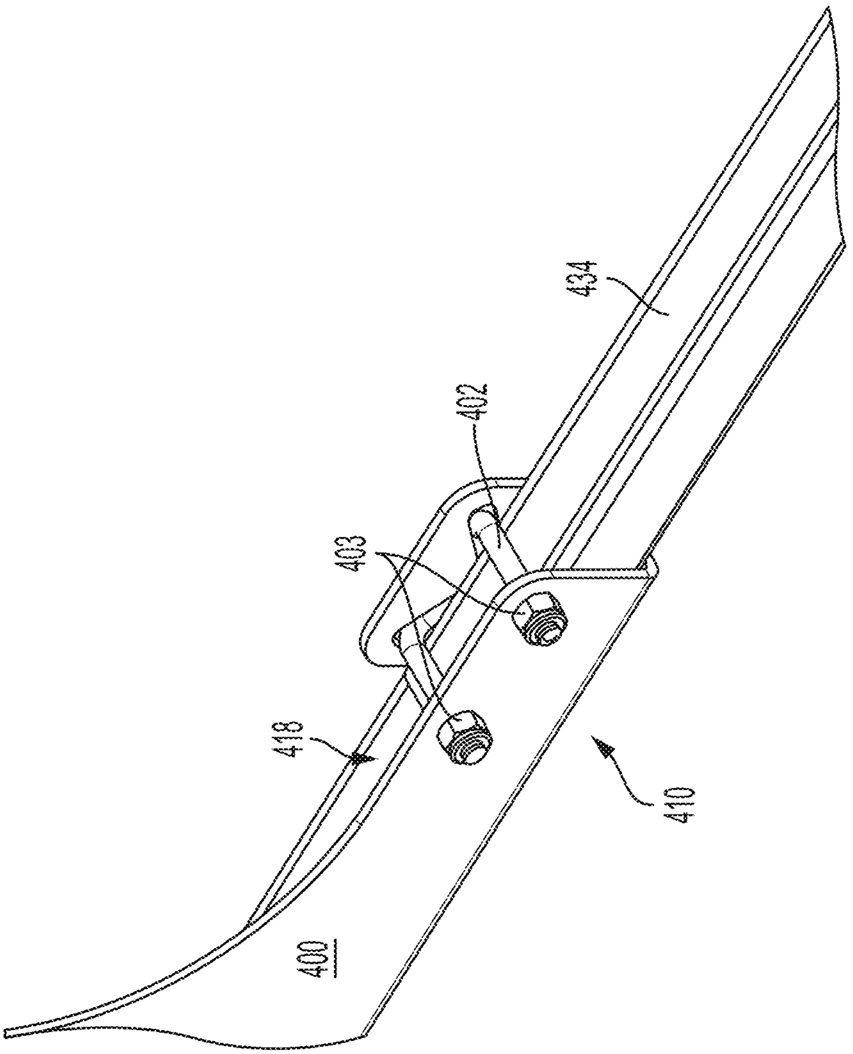
FIG. 2C is an enlarged front perspective view of a portion of a hinge plate with a compressive fastener in accordance with some embodiments of this disclosure.
Figure 2D:
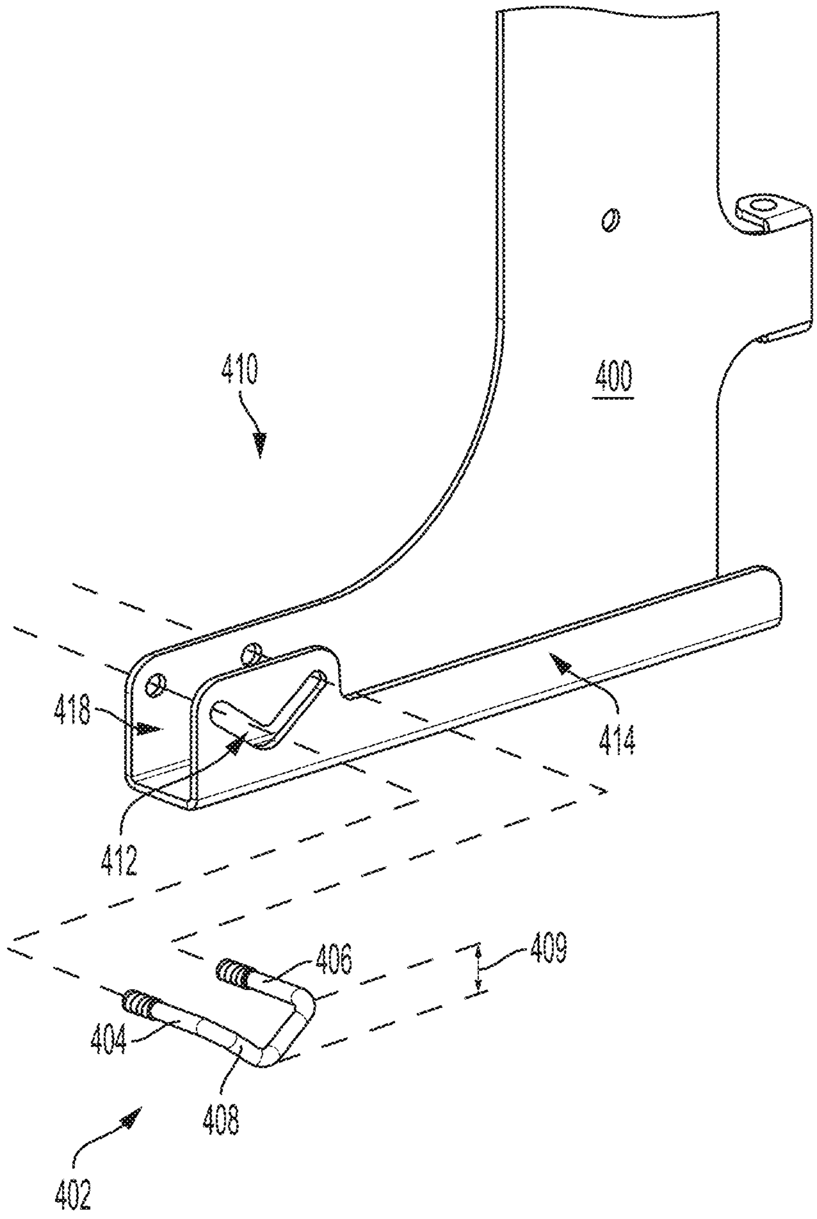
FIG. 2D is an exploded rear perspective view of a portion of a hinge plate with a compressive fastener in accordance with some embodiments of this disclosure.

FIG. 2C is a front perspective view of a portion of a hinge plate 400 with a compressive fastener 402 in accordance with some embodiments of this disclosure. Hinge plate 400 is generally similar to hinge plate 100 shown and described with respect to FIGS. 1, 2A, and 2B, with the exception of a different compressive fastening mechanism, as illustrated in FIGS. 2C and 2D. Hinge plate 400 has a lower support arm portion 410 configured to receive a hoop arm portion 434 within a lower channel 418 formed in the lower support arm portion 410. Hoop arm portion 434 may be a lower hoop arm (as illustrated in FIG. 2C) of a hoop portion, whereby the hoop portion is configured to form a gate frame when coupled to hinge plate 400. Compressive fastener 402 may be used to frictionally engage the hoop arm portion 434 within channel 418 in forming or assembling a gate frame for a self-closing safety gate according to some embodiments of this disclosure. For example, tightening of nuts 403 may create and/or increase the frictional engagement of compressive fastener 402 with a surface to which it comes in contact.

FIG. 2D is an exploded rear perspective view of a portion of a hinge plate 400 and a compressive fastener 402 in accordance with some embodiments of this disclosure. As shown in FIGS. 2D, compressive fastener may comprise a shaped bolt 402 adapted to span the width of the channel 418 in two locations or positions. For example, shaped bolt 402 may span the width of the channel 418 at two positions disposed a horizontal distance along a length of the lower support arm portion 410 of the hinge plate 400. In some embodiments, shaped bolt 402 may have a first portion 404 and a second portion 406, each of the first and second portions 404 and 406 configured to extend laterally across the width of the channel 418, and a third portion 408 extending between the first and second portions 404, 406, the third portion having a vertical offset 409 from the first and second portions 404, 406. In some embodiments, the third portion with the vertical offset could be shaped a variety of different ways. For example, the third portion could be a squared U-shape, or a curved U-shape, or a wavy shape, etc. In the embodiment depicted in FIG. 2D, the vertical offset 409 of the third portion 408 may comprise a V-shaped aspect configured to frictionally engage with a surface of a hoop arm portion 434 received within channel 418, for example. In the particular embodiment shown in FIG. 2D, a shaped slot corresponding to the shape of the third portion of the shaped bolt, such as V-shaped slot 412, is formed in a rear face 414 of channel 418 to facilitate the frictional engagement of the compressive fastener 402 with a surface of the hoop arm portion 434. In an alternate embodiment (not shown), first and second portions of compressive fastener 402 could extend through corresponding openings in a rear face 414 of channel 418; in such an embodiment, compressive fastener 402 could, for example, compress the outer rear side of the rear face 414, which may thereby apply a compressive force to the hoop arm portion 434 disposed within the channel 418 to accomplish a similar mechanism for coupling the hoop portion to the hinge plate 400.

A compressive fastener such as compressive fastener 402 may formed a U-shape when viewed from above (e.g., the first, second, and third portions 404, 406, and 408 forming the three legs of the "U"), and may form a V-shape when viewed straight on or from the rear (e.g., the third portion 408 forming the "V"), for example. Such a compressive fastener may offer advantages to the assembly of a self-closing safety gate according to various embodiments. For example, a shaped bolt 402 may require fewer total parts or components to assemble and/or adjust the width of the gate frame. Additionally, threaded ends of the first and second portions of shaped bolt 402 are configured to extend through a front face of the hinge plate 400, thereby facilitating tightening of nuts 403 on shaped bolt 402 from one side (e.g., the front facing side) of the hinge plate 400.

Figure 3:
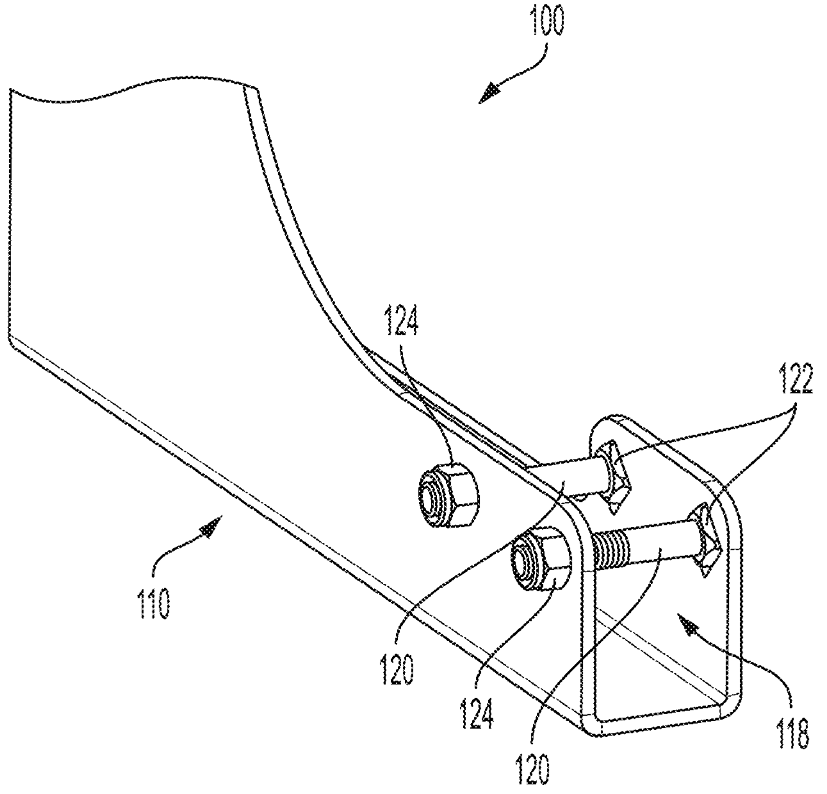
FIG. 3 is an enlarged perspective view of a support arm portion of a hinge in accordance with an embodiment of this disclosure.

FIG. 3 is an enlarged cut-away perspective view of a lower support arm portion 110 and lower channel 118 of a hinge plate 100 according to one exemplary embodiment. In the example illustrated in FIG. 3, a compressive fastener may be used to narrow the width of lower channel 118, and thereby increase the frictional engagement between lower support arm portion 110 and any hoop arm or portion thereof placed or received in channel 118. As one example of a compressive fastener, one or more bolts 120 may be positioned to pass through from one side of a channel to the opposite side of the channel, to span the width of the channel and to narrow the channel when the compressive fastener, such as bolt 120, is operated in a tightening direction.

Figure 4:
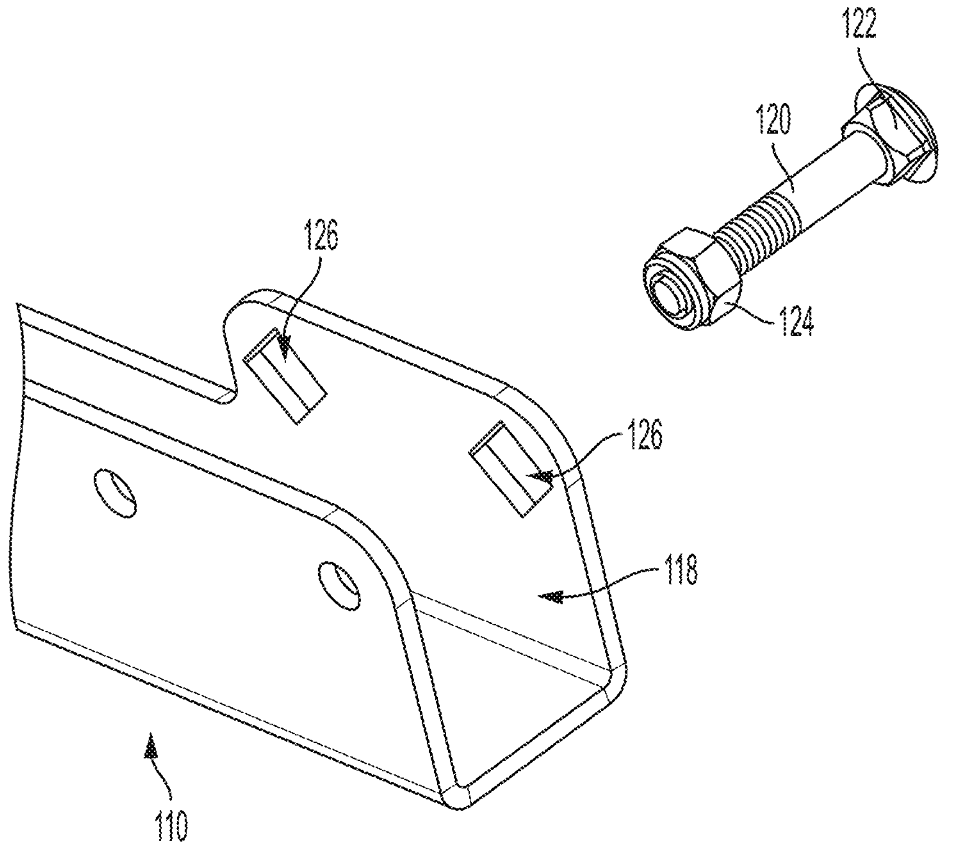
FIG. 4 is an exploded perspective view of a compressive fastener that may be used in forming a self-closing safety gate in accordance with an embodiment of this disclosure.

A compressive fastener, such as the bolt and nut combination 120, 124 shown in FIG. 3, may provide the means for securely engaging a hoop arm of a hoop portion of a self-closing safety gate. The engagement may comprise frictional engagement between the vertical walls of the channel as they are compressed towards each other by the compressive fastener. The frictional engagement may be further enhanced in some embodiments by frictional contact between bolt 120 and a hoop arm. For example, frictional contact could be formed between bolt 120 and an outer surface of the hoop arm to enhance or improve the engagement therebetween. Alternately, or additionally, frictional engagement may be further enhanced in some embodiments by use of a "dimpling" member 122, as illustrated in FIG. 3 for example, disposed on an inner surface of the channel. In FIG. 3, such a dimpling member 122 may be formed as part of the bolt and nut combination 120, 124. The dimpling member 122 may be positioned and shaped such that, when the channel is uncompressed, a hoop arm may be placed and moved into or out of the channel. Upon compression or narrowing of the channel (e.g., via tightening of bolt/nut 120, 124), dimpling member 122 may "dimple" (e.g., indent, or slightly deform) a portion of a surface of the hoop arm to provide an even greater amount of frictional engagement than would be provided by the narrowing of the channel alone. Dimpling member 122 may be formed as part of the shape of the bolt 120, as shown in FIG. 4. In such an embodiment, the dimpling member 122 is a "diamond"-shaped portion of bolt 120 that is configured to protrude slightly through a complementary diamond-shaped opening in the channel. Alternately, dimpling member 122 may be formed as part of the wall of the channel. Other methods of implementing a comparable dimpling member 122 would be apparent to one of ordinary skill in the art.

Alternate compressive fasteners may also be employed as would be apparent to one skilled in the art. Possible examples of alternate compressive fasteners that may be employed to tighten or narrow a channel into frictional engagement with a hoop arm may include a spring-tensioned clamp, one or more ratcheting type closures such as zip-ties, a rope, a vice-grip style clamp that is releasable and may enable an adjustable compressive force, etc.

Figure 5:
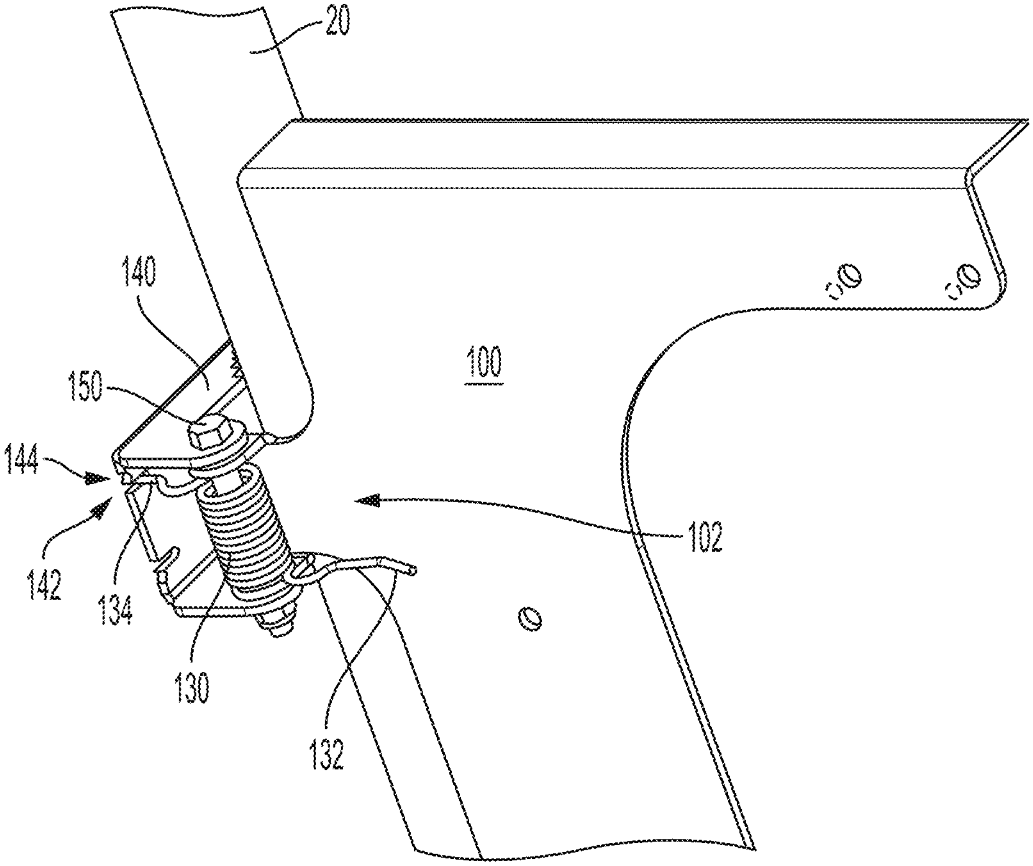
FIG. 5 is a perspective view of an exemplary rotatable coupling portion used in forming a self-closing safety gate in accordance with an exemplary embodiment of this disclosure.

FIG. 5 is a perspective view of an exemplary hinge plate 100 having a rotatable coupling portion 102 or 104 that may be used in forming a self-closing safety gate 10 in accordance with some embodiments. As shown in FIG. 5, hinge plate 100 may be configured to rotatably couple self-closing safety gate 10 to vertical support member 20 via rotatable coupling portion 102 or 104. In certain embodiments, rotatable coupling portions 102, 104 may be configured to rotatably couple hinge plate 100 to vertical support member 20 via mounting bracket or support bracket 140 and pin 150. Mounting/support bracket 140 may be fixedly secured to vertical support member 20 using known methods, such as by welding, or by releasable engagement via nuts and bolts, screws, etc. Pin 150 may be positioned vertically through corresponding openings formed in both the coupling portion 102, 104 and in the mounting bracket 140. Pin 150 allows hinge plate 100 to pivot or rotate about the pin 150. Some embodiments may include both an upper and a lower support bracket 140. For example, upper rotatable coupling portion 102 may be coupled to an upper support bracket 140, and lower rotatable coupling portion 104 may be coupled to a lower support bracket 140, to thereby rotatably couple hinge plate 100 to the vertical support member 20. In some embodiments, the support bracket (or brackets) 140 may be configured to have a gate pivoting axis that is located near the edge of, or even outside of, the access area width to allow the self-closing safety gate 10 to swing clear of the access area when rotated to 90 degrees or beyond to thereby increase or enhance user access to more of the full width of the access area between the vertical support member 20 and the vertical stop member 22, according to some alternate embodiments.

FIG. 5 also illustrates an optional embodiment having a spring-biasing component to bias the self-closing safety gate towards a closed position. Spring 130 is shown in FIG. 5 disposed about pin 150, and having a biasing end 132 configured to contact a surface of hinge plate 100 as shown. Spring 130 further has a tensioning end 134 configured to be disposed within a notch formed in a portion of mounting/support bracket 140. The notch prevents movement of tensioning end 134 of spring 130 during operation of self-closing safety gate 10, and the resulting tension in spring 130 causes biasing end 132 of spring 130 to apply a closing force to a surface of hinge plate 100. In some embodiments, one or more tension adjustment notches 142, 144 may be formed in a portion of mounting/support bracket 140 as shown in FIG. 5. The spring 130 may be configured to be preloaded such that the biasing end 132 of spring 130 is biased to apply a force upon the hinge plate 100 that would have to be overcome when a user applies force to open the self-closing safety gate 10, for example.

Figure 6:
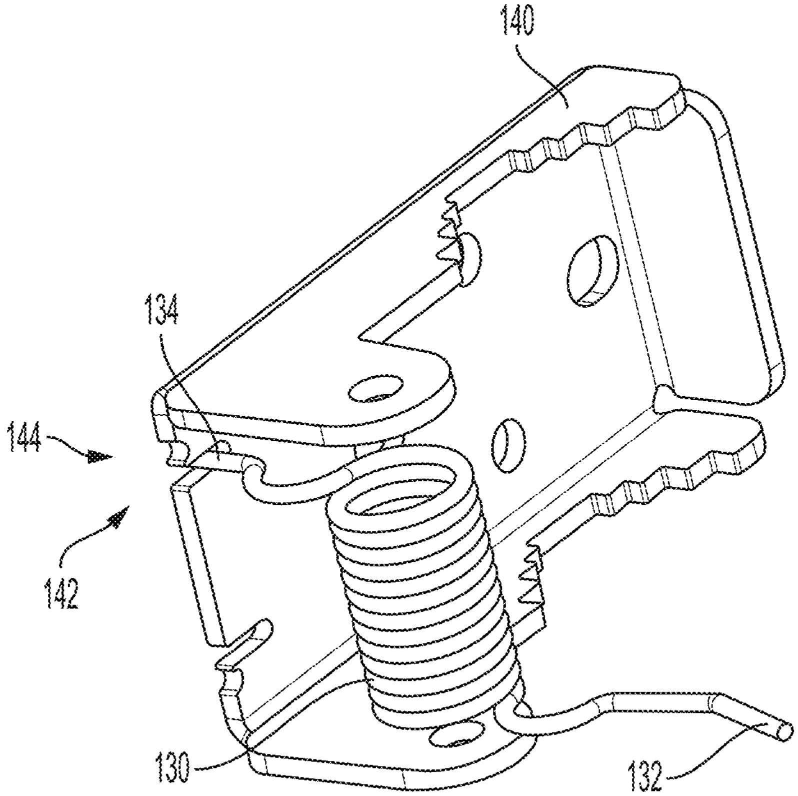
FIG. 6 is an enlarged perspective view of a portion of an exemplary rotatable coupling portion having an optional tension adjustment for a self-closing safety gate in accordance with an exemplary embodiment of this disclosure.

FIG. 6 is an enlarged perspective view of elements of an exemplary rotatable coupling portion that enable use of an optional adjustment of the tension to close the self-closing safety gate 10 in accordance with some embodiments. FIG. 6 shows details of the one or more tension adjustment notches 142, 144. Tension adjustment notches 142, 144 may be formed in portion of support bracket 140 according to some embodiments. For example, FIG. 6 illustrates tensioning end 134 of spring 130 positioned within tension adjustment notch 142. As shown, tension adjustment notch 142 is a deeper notch than, for example, tension adjustment notch 144. Thus, in the embodiment shown in FIG. 6, one could adjust the tension provided by spring 130 (and thereby adjust the biasing force applied to the hinge plate 100) by moving the tensioning end 134 of spring 130 from tension adjustment notch 142 to tension adjustment notch 144. In the exemplary embodiment illustrated, the adjustment described will increase the tension in the spring and thereby increase the biasing force applied by the spring 130 to the hinge plate 100 to close the self-closing safety gate 10. It should be noted that any number of tension adjustment notches may be employed by one of ordinary skill in the art depending on desired operating characteristics and/or space limitations, etc.

Figure 7A:
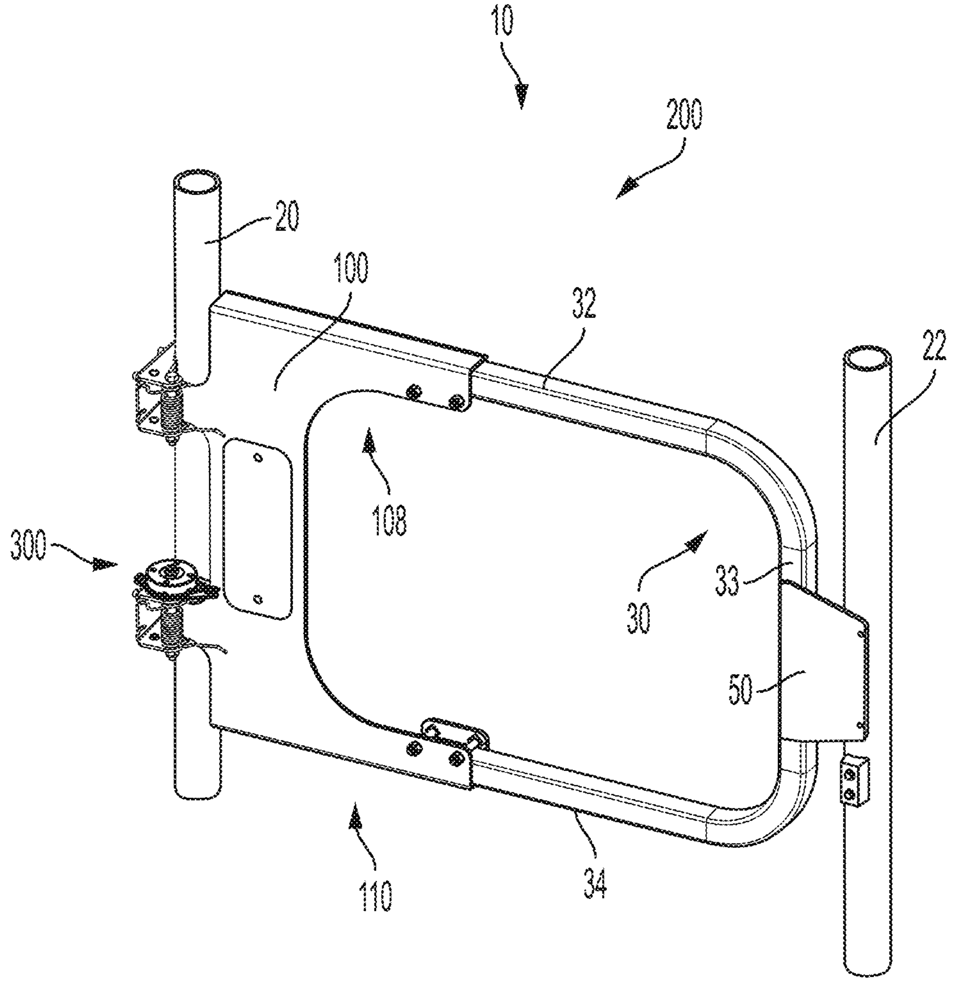
FIG. 7A is a perspective view of a damped, self-closing safety gate in accordance with an exemplary embodiment of this disclosure.

FIG. 7A is a perspective view of a self-closing safety gate 10 according to certain embodiments of this disclosure. The safety gate of FIG. 7A is similar to that illustrated in FIG. 1, but with the addition of a damper or damper assembly 300, as shown in FIG. 7A.

Figure 7B:
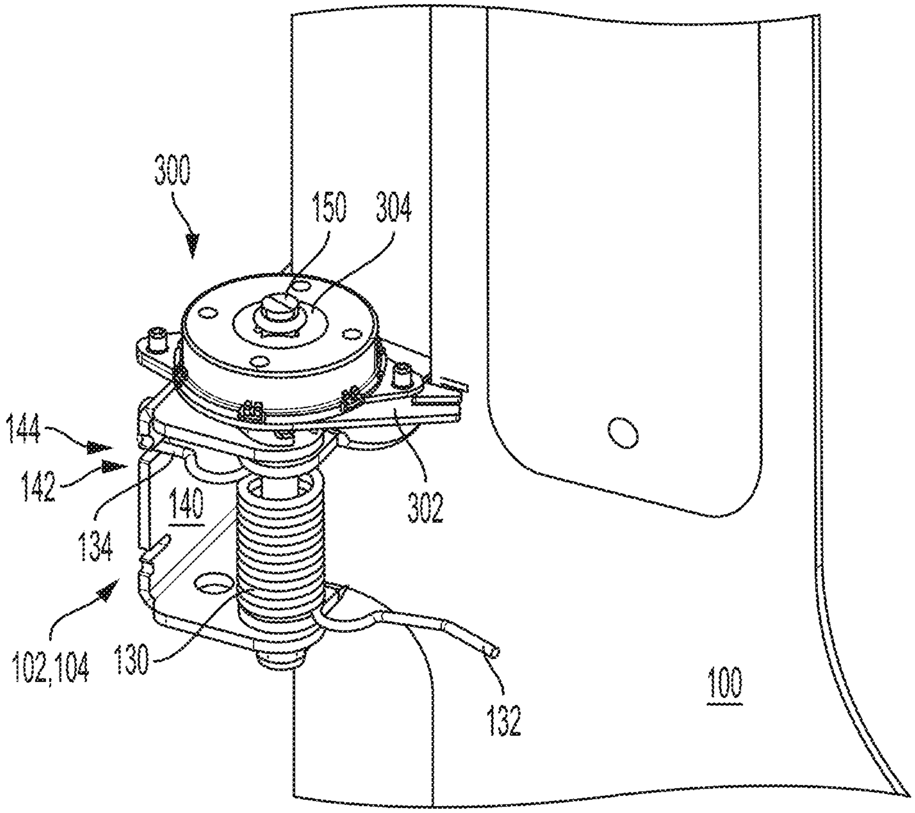
FIG. 7B is an enlarged perspective view of a damper for a self-closing safety gate in accordance with an exemplary embodiment of this disclosure.

FIG. 7B is an enlarged perspective view showing a portion of a self-closing safety gate 10 with a damper assembly 300 operably engaged and configured to reduce the speed of closure of the self-closing safety gate (e.g., from an undamped speed of closure). For example, damper assembly 300 may be a rotary damper adapted to oppose the bias force of the spring assembly and rotatable coupling portion 102 or 104 (e.g., comprising the spring 130, biasing end 132, tensioning end 134, and tension adjustment notches 142, 144 formed in support bracket 140, as shown in FIG. 7B) when the self-closing safety gate is moving towards a closed position. In the embodiment illustrated in FIG. 7B, damper assembly 300 comprises an engagement arm 302 configured to engage with a portion of the hinge plate. Engagement arm 302 is configured to rotate relative to a housing portion 304 of damper assembly 300 to thereby provide damped opposition to the spring bias during closure of the self-closing safety gate. Housing portion 304 may, for example, comprise a cylindrical housing that holds a viscous fluid. Housing portion 304 may be fixedly secured to support bracket 140; for example, pin 150 may be used to secure housing portion 304 of damper assembly 300 to support bracket 140. Pin 150 may align with and/or form an axis of rotation of the hinge plate 100 (and of the self-closing safety gate 10).

In some embodiments, damper or damper assembly 300 may comprise a fluid-based damper such that the speed of closure of the gate frame of the self-closing safety gate from an open position to the closed position may be adjusted by varying the viscosity of the fluid used in the fluid-based damper (e.g., by changing the fluid to that of a different viscosity). In some embodiments, the damper assembly 300 may be removably attached, which may enable removing and/or replacing the damper assembly 300 to better suit the needs of the particular self-closing safety gate. If the damper assembly 300 is removed, for example, the self-closing safety gate 10 is configured to retain the self-closing functionality provided by the spring assembly in conjunction with the rotatable coupling portion(s). In some embodiments of this disclosure, the rotary damper assembly 300 is configured to reduce the speed of closure of the gate frame 200 towards the closed position, but does not resist movement of the gate frame 200 towards an open position. Alternatively, the rotary damper assembly 300 could be configured to resist (dampen) movement of the gate frame 200 in both directions (opening or closing), if so desired, according to some embodiments. In some embodiments of this disclosure, the damper assembly 300 allows the gate frame 200 to rotatably move to an open position that is angularly disposed at least 90 degrees from the closed position. In some preferred embodiments, the damper assembly 300 allows the gate frame 200 to rotatably move to an open position that is angularly disposed between 1 and 180 degrees from the closed position.

The damper assembly 300 described with reference to FIG. 7B works against the self-closing force of spring 130 to slow the motion of the closing components. Damper assembly 300 could, for example, comprise any variety of dampers utilizing viscous fluids, friction, or air resistance to slow the motion of the moving parts of the gate. The damping device may be located at the hinge side (proximal side) of the gate or the strike side (distal side) of the gate. Damper assembly 300 may be configured to act over the entire range of motion of the self-closing safety gate 10, or only a portion of the motion as in the case of certain shock-absorbing devices.

The damper assembly 300 can prevent slamming of the self-closing safety gate 10 by providing resistance to the rotation of the gate. The resistance may be provided by using a device that uses a viscous fluid consolidated between a static surface and a surface that moves relative to the angular swing of the gate. Such a damper 300 may thereby regulate the angular velocity of the gate frame of a self-closing safety gate upon closure so that it does not accelerate uncontrolled as it swings shut. This may also allow the self-closing safety gate to remain open for a longer period of time after it has been released, enabling a user to complete their access and/or passage without being concerned about a slamming hazard from the self-closing safety gate itself. For example, the duration of time it takes the gate to swing from an open position to the closed position may be increased beyond the normal (undamped) closing time of the gate (e.g., anywhere from 1 or 2 seconds longer than the undamped closing time, up to as much as 10 to 15 seconds or more). In some preferred embodiments, damper 300 may provide resistance to the bias force of the spring assembly throughout the arc of rotation of the gate frame 200 towards the closed position, including during the last portion of movement before reaching the closed position.

A damped, self-closing safety gate may use a liquid fluid of a specific viscosity in a rotary damper, according to some embodiments. For example, some embodiments may incorporate a rotational damper that utilizes viscous fluid to damp rotational motion of a self-closing safety gate. This type of rotational or rotary damper can be mounted coaxially to couple stationary and moving components of the gate. In some arrangements, the stationary surface can be a hinge bracket or support bracket, and in other examples the stationary surface may not be part of the gate. In some examples the rotational damper may be positioned eccentrically from the pivoting axis of the gate hinge. A viscous fluid may provide a more consistent damped closing than that provided by a frictional damper, for example. As such, a viscous fluid type damper may require less adjustment and/or replacement over time than certain other types of dampers. A viscous fluid type damper may also provide a more consistent closing velocity, regardless of spring tension or gate width, for example. However, frictional type dampers may also be employed according to some embodiments of this disclosure, For example, friction in the device may be created and/or adjusted by tightening the engagement or contact between two components using an adjustable fastener. In another example, friction in the dampening device may be generated using a material having a specific coefficient of friction between two moving (e.g., rotating) components of the gate (or operably coupled to the gate). In another example, friction in the dampening device may be caused by a linear motion of materials in contact with a specific coefficient of friction.

Figure 7C:
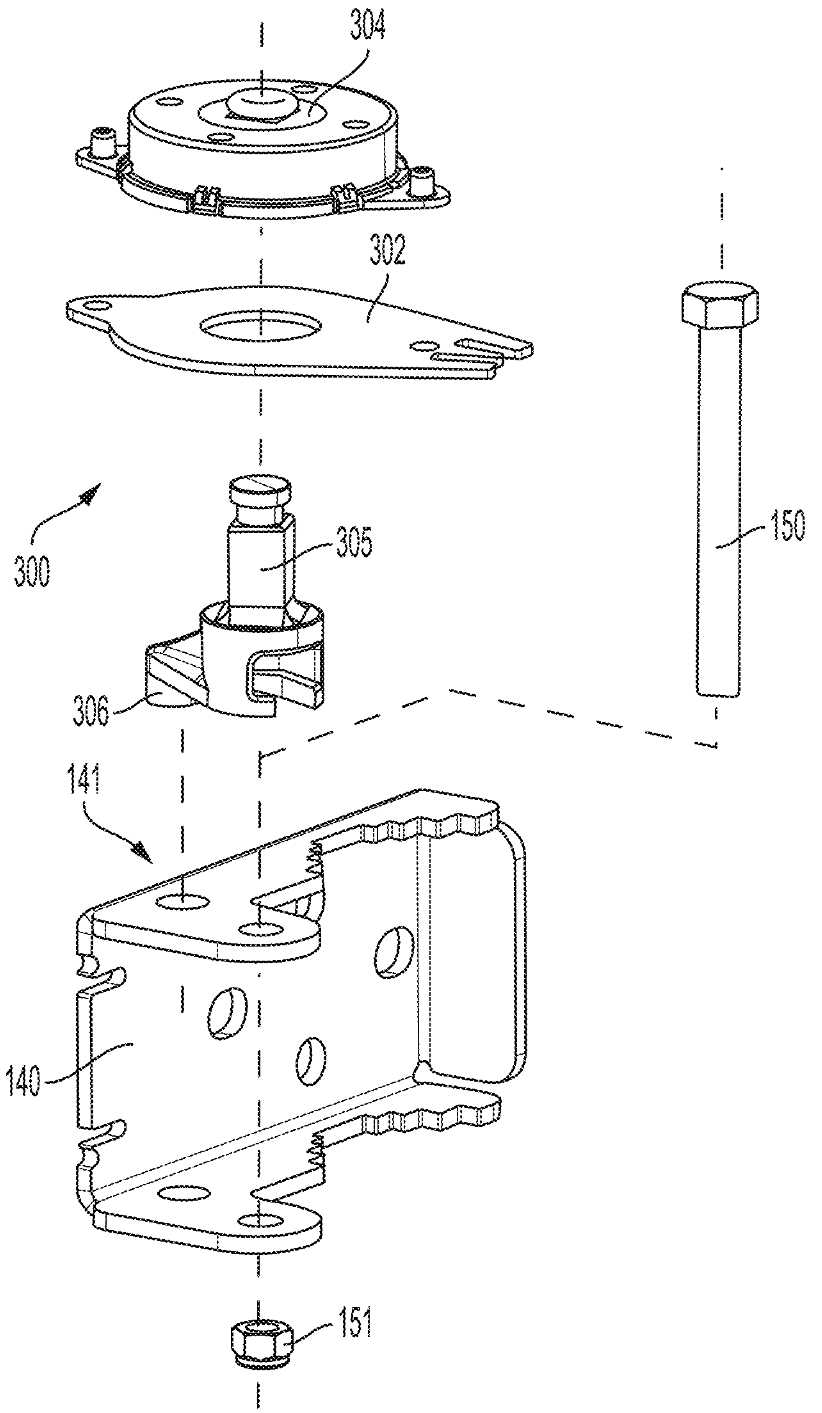
FIG. 7C is an exploded perspective view of a damper mounting arrangement for a self-closing safety gate in accordance with an exemplary embodiment of this disclosure.

As described previously, a mounting bracket 140 may be fixedly secured to a vertical support member 20 of a self-closing safety gate 10, and a pin 150 may be positioned vertically through corresponding openings formed in the coupling portions 102, 104 of the hinge plate 100 and in the mounting bracket 140. FIG. 7C is an exploded perspective view of a damper assembly 300 illustrating an exemplary mounting arrangement. The exemplary damper assembly 300 of FIG. 7C comprises a damper housing portion 304, an engagement arm 302, and a damper stud 305 configured to be coupled to mounting bracket 140 using pin 150 and nut 151 as shown in FIG. 7C. In some embodiments, damper stud 305 may include a stabilizer portion 306 configured to align and extend downward through opening 141 in mounting bracket 140. The placement of stabilizer portion 306 in opening 141 may improve the function and/or operation of damper assembly 300. For example, the stabilizer portion 306 placed in opening 141 may enable damper assembly 300 to resist twisting torque during rotation of engagement arm 302 relative to housing portion 304 during opening and closing of self-closing safety gate 10, according to some embodiments. Stabilizer portion 306 may be disposed radially outward from an axis of rotation of damper assembly 300 in some embodiments. This may, for example, help prevent sudden changes in the speed of closure of self-closing safety gate 10 while closing due to rotational slippage about the axis of rotation that might otherwise occur.

In some embodiments, the damper stud 305 can be attached to the mounting bracket 140 by securing it under the head of pin 150 and tightening with nut 151, or by attaching it with other comparable fasteners or by other known means. In other examples, the damper stud 305 and stabilizer portion 306 could be integrated into or integrally formed with the damper 300. In yet another example, damper stud 305 and stabilizer portion 306 could be integrated into the mounting bracket 140. Similarly, the damper engagement arm 302 could be formed as part of the damper assembly 300, or damper engagement arm 302 could be formed as an extension of the gate frame 200.

Various embodiments and examples have been described herein. These and other variations that would be apparent to those of ordinary skill in this field with the benefit of these teachings would be within the scope of this disclosure.

What is claimed is:

1. A self-closing safety gate comprising:

a gate frame configured to extend horizontally across an access area between a vertical support member and a vertical stop member, the gate frame comprising at least one rotatable coupling portion disposed along a vertical portion of the gate frame, the at least one rotatable coupling portion configured to rotatably couple the gate frame to the vertical support member via a support bracket connected to the vertical support member to permit the gate frame to rotatably swing between an open position and a closed position;

a spring assembly operably coupled to the gate frame and the vertical support member to bias the gate frame towards the closed position, the spring assembly comprising a spring coupled to the support bracket, the bias of the spring assembly being adjustable based on a position of a tensioning end of the spring relative to the support bracket; and a rotary damper assembly that opposes the force of the spring assembly bias to reduce a speed of closure of the gate frame from the open position to the closed position, the rotary damper assembly being removably attached to the support bracket.

2. The self-closing safety gate of claim 1, wherein the rotary damper assembly comprises a damper housing portion having an engagement arm coupled to the damper housing portion, the engagement arm being configured to engage a portion of the gate frame and move with movement of the portion of the gate frame.

3. The self-closing safety gate of claim 2, wherein the damper housing portion of the rotary damper assembly is a cylindrical housing containing a viscous fluid, and the engagement arm is configured to engage the gate frame and rotate relative to the cylindrical housing with movement of the gate frame.

4. The self-closing safety gate of claim 1, wherein the gate frame is comprised of a hinge plate and a hoop portion, the hinge plate being rotatably coupled to the vertical support member, the hoop portion being coupled to the hinge plate, the hoop portion including a hoop distal portion comprising a strike plate, the strike plate adapted to stop the closure of the gate frame when the strike plate contacts the vertical stop member.

5. The self-closing safety gate of claim 4, wherein the hinge plate comprises an upper rotatable coupling portion and a lower rotatable coupling portion disposed along a vertical portion of the hinge plate.

6. The self-closing safety gate of claim 5, wherein the support bracket comprises an upper support bracket and a lower support bracket, the upper support bracket connected to the vertical support member and rotatably coupled to the upper rotatable coupling portion of the hinge plate, and the lower support bracket connected to the vertical support member and rotatably coupled to the lower rotatable coupling portion of the hinge plate.

7. The self-closing safety gate of claim 6, wherein the upper and lower support brackets further comprise a gate pivoting axis disposed near an edge of the access area to allow the gate frame to swing clear of the access area when opened to at least 90 degrees to thereby enhance access to the access area between the vertical support member and the vertical stop member.

8. The self-closing safety gate of claim 7, wherein the spring assembly is disposed coaxial with the gate pivoting axis.

9. The self-closing safety gate of claim 7, wherein the rotary damper assembly comprises a damper housing portion mounted coaxially with the gate pivoting axis.

10. The self-closing safety gate of claim 7, wherein the rotary damper assembly comprises a damper housing portion positioned eccentrically from the gate pivoting axis.

11. The self-closing safety gate of claim 1, wherein the rotary damper assembly is independent of the spring assembly.

12. The self-closing safety gate of claim 1, wherein the rotary damper assembly is mounted to the support bracket.

13. The self-closing safety gate of claim 1, wherein the rotary damper assembly is mounted to the gate frame.

14. A self-closing safety gate comprising:

a gate frame configured to extend horizontally across an access area between a vertical support member and a vertical stop member, the gate frame comprising at least one rotatable coupling portion disposed along a vertical portion of the gate frame, the at least one rotatable coupling portion configured to rotatably couple the gate frame to the vertical support member via a support bracket connected to the vertical support member to permit the gate frame to rotatably swing between an open position and a closed position, the gate frame further comprising a hinge plate and a hoop portion, the hinge plate being rotatably coupled to the vertical support member, the hoop portion being coupled to the hinge plate, the hoop portion including a hoop distal portion comprising a strike plate, the strike plate adapted to stop the closure of the gate frame when the strike plate contacts the vertical stop member;

a spring assembly operably coupled to the gate frame and the vertical support member to bias the gate frame towards the closed position; and a damper assembly that opposes the force of the spring assembly bias to reduce a speed of closure of the gate frame from the open position to the closed position, the damper assembly comprising a fluid-based damper, the speed of closure of the gate frame from the open position to the closed position being affected by a viscosity of a first fluid in the fluid -based damper, the damper assembly further comprising a rotary damper, the rotary damper having a damper housing portion having an engagement arm coupled to the damper housing portion, the engagement arm being configured to engage a portion of the gate frame and move with movement of the portion of the gate frame, the damper assembly further comprising a damper stud coupling the damper housing portion to the support bracket, the damper stud having a stabilizer portion extending through an opening in the support bracket.

15. The self-closing safety gate of claim 14, wherein the hinge plate comprises an upper rotatable coupling portion and a lower rotatable coupling portion disposed along a vertical portion of the hinge plate.

16. The self-closing safety gate of claim 15, wherein the support bracket comprises an upper support bracket and a lower support bracket, the upper support bracket connected to the vertical support member and rotatably coupled to the upper rotatable coupling portion of the hinge plate, and the lower support bracket connected to the vertical support member and rotatably coupled to the lower rotatable coupling portion of the hinge plate.

17. The self-closing safety gate of claim 16, wherein the upper and lower support brackets further comprise a gate pivoting axis disposed near an edge of the access area to allow the gate frame to swing clear of the access area when opened to at least 90 degrees to thereby enhance access to the access area between the vertical support member and the vertical stop member.

18. The self-closing safety gate of claim 14, wherein the spring assembly comprises a spring disposed in the support bracket, the bias of the spring assembly being adjustable based on a position of a tensioning end of the spring relative to the support bracket.

19. A self-closing safety gate comprising:

a gate frame configured to extend horizontally across an access area between a vertical support member and a vertical stop member, the gate frame comprising a hinge plate having an upper rotatable coupling portion and a lower rotatable coupling portion disposed along a vertical portion of the hinge plate, the upper and lower rotatable coupling portions of the hinge plate configured to rotatably couple the gate frame to the vertical support member via an upper support bracket and a lower support bracket, the upper and lower support brackets being connected to the vertical support member, the upper support bracket being rotatably coupled to the upper rotatable coupling portion of the hinge plate and the lower support bracket being rotatably coupled to the lower rotatable coupling portion of the hinge plate to permit the gate frame to rotatably swing between an open position and a closed position;

a spring assembly operably coupled to the gate frame and the vertical support member to bias the gate frame towards the closed position; and a rotary damper assembly that opposes the force of the spring assembly bias to reduce a speed of closure of the gate frame from the open position to the closed position, the rotary damper assembly comprising a damper housing portion coupled to an engagement arm, the engagement arm configured to engage and move with a portion of the gate frame, wherein the damper housing portion of the rotary damper assembly is a cylindrical housing containing a viscous fluid, and the engagement arm is configured to engage the gate frame and rotate relative to the cylindrical housing with movement of the gate frame.

20. The self-closing safety gate of claim 19, wherein the rotary damper assembly comprises a fluid-based damper.

21. The self-closing safety gate of claim 20, wherein the speed of closure of the gate frame from the open position to the closed position is determined by selecting a first fluid in the fluid-based damper having a first viscosity.

22. The self-closing safety gate of claim 19, wherein the rotary damper assembly further comprises a damper stud coupling the damper housing portion to the support bracket, the damper stud having a stabilizer portion extending through an opening in the support bracket.

23. The self-closing safety gate of claim 22, wherein the stabilizer portion of the damper stud is disposed radially outward from an axis of rotation of the rotary damper assembly.

24. The self-closing safety gate of claim 22, wherein the damper housing portion of the rotary damper assembly is a cylindrical housing containing a viscous fluid, and the engagement arm is configured to engage the gate frame and rotate relative to the cylindrical housing with movement of the gate frame.

25. The self-closing safety gate of claim 24, wherein the rotary damper assembly is removably attached to the support bracket.

26. The self-closing safety gate of claim 19, wherein the rotary damper assembly reduces the speed of closure of the gate frame throughout its rotation towards the closed position from an undamped speed.

27. The self-closing safety gate of claim 26, wherein the rotary damper assembly is configured to reduce the speed of closure of the gate frame towards the closed position, but does not resist movement of the gate frame towards the open position.

28. The self-closing safety gate of claim 19, wherein the gate frame further comprises a hoop portion, the hoop portion being coupled to the hinge plate, the hoop portion including a hoop distal portion comprising a strike plate, the strike plate adapted to stop the closure of the gate frame when the strike plate contacts the vertical stop member.

29. The self-closing safety gate of claim 28, wherein the hoop portion comprises two horizontal members that extend from the hinge plate to the hoop distal portion.

30. The self-closing safety gate of claim 28, wherein the hinge plate and the hoop portion are integrally formed.

31. The self-closing safety gate of claim 19, wherein the upper and lower support brackets further comprise a gate pivoting axis disposed near an edge of the access area to allow the gate frame to swing clear of the access area when opened to at least 90 degrees to thereby enhance access to the access area between the vertical support member and the vertical stop member.

32. The self-closing safety gate of claim 19, wherein the spring assembly comprises a spring disposed in the support bracket, the bias of the spring assembly being adjustable based on a position of a tensioning end of the spring within the support bracket.

33. The self-closing safety gate of claim 19, wherein the open position of the gate frame is angularly disposed at least 90 degrees from the closed position.

* * * * *